(12) United States Patent
Sakatani et al.

(10) Patent No.: US 6,172,847 B1
(45) Date of Patent: Jan. 9, 2001

(54) ROTATIONAL ASSEMBLY FOR DISC DRIVE DEVICE HAVING SMALL RUNOUT AND REDUCED AXIAL DISPLACEMENT

(75) Inventors: Ikunori Sakatani; Katsuhiko Tanaka; Hiromitsu Muraki; Etsuo Maeda; Hideo Okano; Kazuhiro Uemura, all of Fujisawa (JP)

(73) Assignee: NSK Ltd., Tokyo (JP)

(*) Notice: Under 35 U.S.C. 154(b), the term of this patent shall be extended for 0 days.

(21) Appl. No.: 09/049,005

(22) Filed: Mar. 27, 1998

(30) Foreign Application Priority Data

Mar. 27, 1997 (JP) .................................................. 9-075314
Jul. 8, 1997 (JP) .................................................. 9-182159
Mar. 19, 1998 (JP) .................................................. 10-70332

(51) Int. Cl.[7] .................................................. G11B 17/02
(52) U.S. Cl. .................................................. 360/99.08
(58) Field of Search .......................... 360/107, 98.07, 360/99.04, 99.08, 99.09, 99.11; 310/256

(56) References Cited

U.S. PATENT DOCUMENTS

| 4,706,143 | * | 11/1987 | Asada et al. | 360/107 |
| 4,972,283 | * | 11/1990 | Kim | 360/107 |
| 5,453,892 | * | 9/1995 | Hasegawa et al. | 360/107 |
| 5,581,425 | * | 12/1996 | Choi | 360/107 |
| 5,754,374 | * | 5/1998 | Kim | 360/107 |

FOREIGN PATENT DOCUMENTS

| 63-94327 | 6/1988 | (JP) . |
| 6-178497 | 6/1994 | (JP) . |
| 7-310739 | 11/1995 | (JP) . |
| 9-149586 | 6/1997 | (JP) . |

* cited by examiner

Primary Examiner—David Davis
(74) Attorney, Agent, or Firm—Evenson, McKeown, Edwards & Lenahan, P.L.L.C.

(57) ABSTRACT

A disc drive device includes a rotational assembly which is adapted to mount a disc thereon and is rotatably driven by a motor. The rotational assembly is rotatably supported on a support assembly by a radial hydrodynamic fluid bearing and a thrust bearing. An axial load is applied to the thrust bearing by a magnetic attractive force of up to 30N and is greater than a dead weight of the rotational assembly.

9 Claims, 9 Drawing Sheets

ROTATIONAL ASSEMBLY FOR DISC DRIVE DEVICE HAVING SMALL RUNOUT AND REDUCED AXIAL DISPLACEMENT

FIELD OF THE INVENTION

The present invention relates to a disc drive device used in information equipment and audio-video equipment, and in particular in optical disc units and magnetic disc units.

BACKGROUND OF THE INVENTION

Heretofore, disc drive devices have been constructed e.g. as shown in FIG. 1. Such a disc drive unit is typically used for a spindle motor.

More specifically, the disc drive device has a rotational assembly 10 on which a disc (not shown) can be mounted, a shaft 1 on which the rotational assembly 10 is rotatably supported by means of two ball bearings 23, and a base 7 to which the lower end of the shaft 1 is secured The rotational assembly 10 and the disc mounted thereon are rotatably driven by a motor M which is disposed between the base 7 and the rotational assembly 10. The motor M has a rotor 8 secured to the rotational assembly 10, and a stator 9 secured to the base 7 with the rotor 8 and stator 9 radially opposed to each other.

The rotational assembly 10 comprises a hub in tie case of the spindle motor.

With the magnetic disc units, however, due to the development of high recording densities, it is desirable that the deviation of non-repetitive runout (NRRO) in the disc drive device used in the magnetic disc units be small. The term "non-repetitive runout" is also referred to as "non-repeatable runout".

With the conventional disc drive device, as shown in FIG. 1, the deviation of non-repetitive runout (NRRO) needs to be small with the ball bearings 23. However, since the ball bearings 23 have vibration due to rolling of the balls and vibration due to errors in the shape of the bearing members, even with improved manufacturing accuracy, it is difficult to keep the deviation of non-repetable runout below a specified value.

FIG. 2 shows another example of the conventional disc drive devices, that is a spindle motor, which uses hydrodynamic fluid bearings with small deviation of non-repetitive runout, for both a radial bearing and a thrust bearing. In this example, the rotational assembly includes a shaft 1 and a hub 40.

A sleeve 6 is fitted into the base 7 to which the motor M is mounted, and provided with a cylindrical bole, the inner peripheral surface of which is formed with a radial bearing face 6a. The radial bearing face 6a of the sleeve 6 and the outer peripheral surface of the shaft 1 cooperate to form a radial hydrodynamic fluid bearing. On the other hand, the lower end face 1a of the shaft 1 and the upper surface 58a of the thrust bearing 58 cooperate to form a thrust hydrodynamic fluid bearing to support the thrust load.

Although such hydrodynamic fluid bearings make small the deviation of non-repetitive runout, there is a drawback that the shaft 1 with the hub 40 can easily come off the sleeve 6 if it receives shock or load from outside in the direction where the shaft comes off Therefore, in the example of FIG. 2, a stopper 60 is mounted to the hub 40 in an interference relation with a flanged portion 6b of the sleeve 6. However, it is troublesome to provide such a stopper 60. And during transportation, the stopper 60 sometimes bumps the axially opposing flange portion 6b of the sleeve 6 causing abrasion debris.

SUMMARY OF THE INVENTION

An object of the present invention is, in view of the above problems, to provide a disc drive device wherein the deviation of non-repetitive runout is small, the starting torque is small, and the introduction of lubricant and the assembly are simple.

Another object of the present invention is to provide a spindle motor in which the deviation of non-repetitive runout is small, and can be placed in an inverted state and has good shock resistance.

DETAILED DESCRIPTION OF THE PRESENT EMBODIMENTS

In order to solve the above problems, a disc drive device has a rotational assembly on which a disc can be mounted, which is rotatably driven by a motor, and which is rotatably supported on a support assembly by means of a radial hydrodynamic fluid bearing and a thrust bearing which is a hydrodynamic fluid bearing or pivot bearing.

An axial load is further applied to the thrust bearing by means of a magnetic attractive force of up to 30N and greater than a dead weight of the rotational assembly. One of the rotational assembly and the support assembly has a shaft installed therein, with an end face of the shaft constituting the thrust bearing.

With the disc drive device in one embodiment of the present invention, the motor may have a rotor secured to the rotational assembly and a stator secured to the support assembly. An axial load may be made to act upon the thrust bearing by means of a magnetic attractive force between the rotor and the stator of up to 30N and above the dead weight of the rotational assembly.

According to the present invention, since the rotational assembly is supported by a radial hydrodynamic fluid bearing and a thrust bearing which is a hydrodynamic fluid bearing or pivot bearing the deviation of non-repetitive runout (NRRO) is small, and the starting torque is small. Moreover, since a predetermined magnetic attractive force acts in the axial direction, there is no restriction to the orientation dung use. Furthermore since the shaft does not take the axial load with the flanged portion, assembling is simplified.

Figure 3:
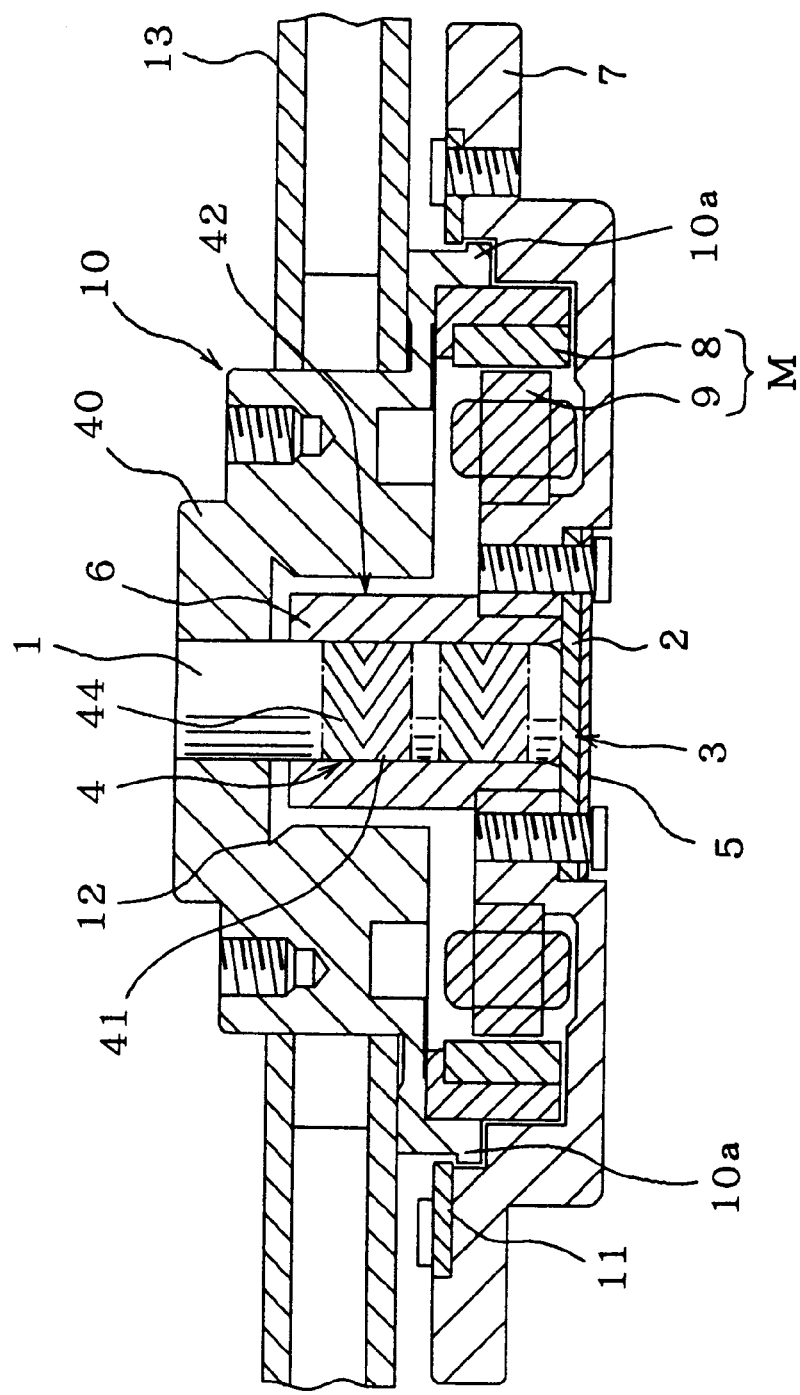
FIG. 3 is a cross sectional view of an example of the disc drive device according to the present invention.

Now, in the drawings, FIG. 3 shows a first embodiment of the disc drive units.

A rotational assembly 10, on which a disc 13 can be mounted, has a hub 40 and a shaft 1. The shaft 1 is fixed to the hub 40, and fitted into a sleeve 6. A base 7 is engagingly secured to an outer peripheral surface of the lower end of the sleeve 6. A thrust plate 2 closes off the cylindrical bore of the sleeve 6, and a steel support 5 is positioned in contact with the lower face of the thrust plate 2. The thrust plate 2 and the steel support 5 are secured to the base 7. The support 5, the thrust plate 2, the base 7 and the sleeve 6 constitute a support assembly 42.

A radial bearing face 41 is provided on an inner peripheral surface of the sleeve 6, and the radial bearing face 41 and a mating outer peripheral surface of the shaft 1 constitute a radial hydrodynamic fluid bearing 4. Moreover, an end face of the shaft 1, and a mating thrust bearing face provided on the thrust plate 2 constitute a thrust bearing 3.

The rotational assembly 10 is rotatably supported on the support assembly 42 by means of the radial hydrodynamic fluid bearing 4 and the thrust bearing 3.

A retaining member 11 is secured to an outer peripheral portion of the support member 42. The rotational assembly 10 has an outer peripheral portion 10a an upper face portion of which opposes an edge portion of the retaining member 11 via an axial gap, and a lower face portion of which opposes the support assembly 42 via an axial gap.

The thrust plate 2 can have a groove for producing a dynamic pressure, in the thrust bearing face which co-operates with the shaft 1, so that the thrust bearing 3 makes up a thrust hydrodynamic fluid bearing. Furthermore, the outer peripheral surface of the shaft 1 bas a groove 44 for producing a dynamic pressure, thus making up the radial hydrodynamic fluid bearing 4.

If the thrust plate 2 is made by plastic injection molding, then the groove for producing the dynamic pressure can be made by molding, so that manufacturing costs are low. In particular, if made by plastic injection molding with carbon fiber and Teflon (registered trademark), i.e. polytetrafluoroethylene, added to a base of PPS (polyphenylene sulfide resin), then this gives excellent sliding properties, strength, and moldability, which is desirable.

In the case where the axial load is small, then the steel support 5 for reinforcing the plastics thrust plate 2 can be omitted. Furthermore, it is possible to omit the groove for producing the dynamic pressure for the thrust bearing and instead to provide at least one of the thrust plate 2 and the end face of the shaft 1 with a convex hemispherical surface, so that the rotational assembly 10 is supported by point contact to give a so-called pivot bearing.

On the other band, if the sleeve 6 in the radial hydrodynamic fluid bearing 4 is made from a copper-based material, then the groove for producing a dynamic pressure force can be easily provided on the inner peripheral surface of the sleeve 6. If the sleeve 6 is made from a copper-based material, the sliding characteristics with the stainless steel shaft 1 are excellent, so starting and stopping durability is excellent. The material for the sleeve 6 is, however, not limited to copper-based one, and can be made of stainless steel such as austenitic or ferritic one. The sleeve 6 and the thrust plate 2 are directly fixed to the base 7, and hence assembly is simplified and reliability is good.

The motor M has a rotor 8 fixed to the rotational assembly 10 and a stator 9 fixed to the support assembly 42, so that the rotational assembly 10 is rotated by the motor M. By having the rotor 8 and the stator 9 displaced axially from each other, so that the lateral central cross sectional face of the stator 9 is lower than that of the rotor 8 in FIG. 3, an axial load due to a magnetic attraction of up to 30N and greater than the dead weight of the rotational assembly 10 is applied to the thrust bearing 3. Preferably, the axial magnetic attractive force is greater than two times the dead weight of the rotational assembly 10 and up to 10N.

If the drive unit is used in an upside down orientation with the magnetic attractive force less than the dead weight of the rotational assembly 10, then since the magnetic attractive force is less than the dead weight of the rotational assembly 10, the shaft 1 will cease to be in contact with the thrust plate 2, so that the outer peripheral portion 10a of the rotational assembly 10 contacts with the retaining member 11.

With the magnetic attractive force greater than 30N, the axial load on the thrust bearing 3 is large so that start up torque is increased causing a problem with wear at the time of starting and stopping.

When this magnetic attractive force is made more than two times the dead weight of the rotational assembly 10, even if an external part is bumped, the contact between the shaft 1 and the thrust plate 2 is maintained. Moreover, if this is made less than 10N, the axial load on the thrust plate 2 is reduced and hence a high cost material such as ceramic need not be used for the thrust plate 2, with the advantage of reduced cost.

Figure 1:
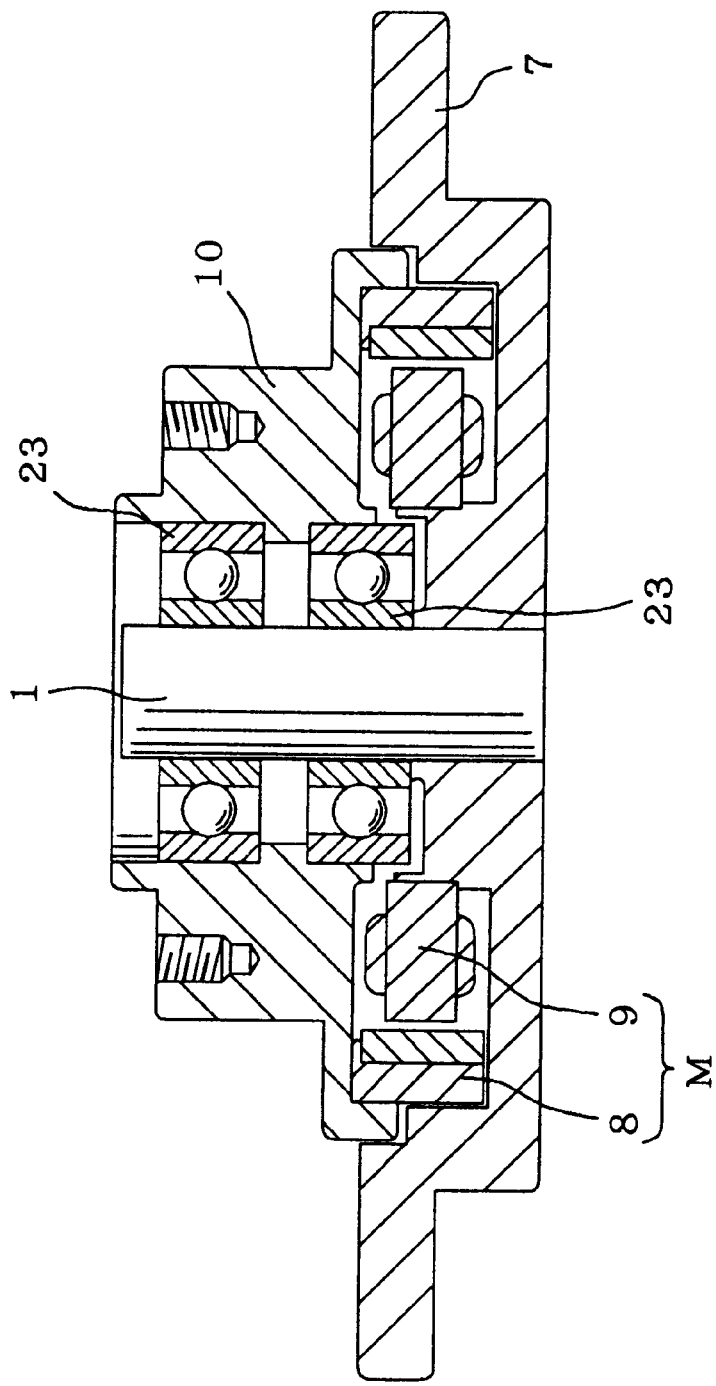
FIG. 1 is a cross sectional view of a conventional disc drive device.
Figure 2:
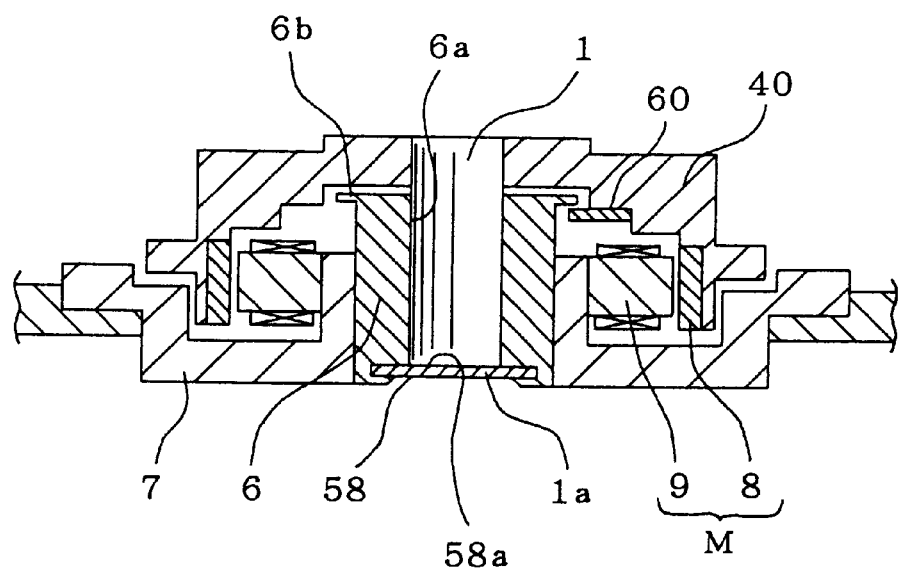
FIG. 2 is a cross sectional view of a conventional spindle motor.

Furthermore, the retaining member 11 is fitted to the support assembly 42 as a means to prevent the rotational assembly 10 from coming off the support assembly 42 at the time of a shock load action during transport of the individual unit. Fitting the retaining member 11 to the support assembly 42 such that it engages with the outer peripheral rim portion 10a of the rotational assembly 10, gives a simpler construction of the bearing compared to providing the flanged portion on the shaft 1 in FIG. 2, with the advantage that the cost is reduced.

The retaining member 11 may be made from a material such as aluminum alloy, stainless steel, or plastics etc. However, if the retaining member 11 is made from a plastics material having excellent self lubricating properties, even if the rotational assembly 10 contacts the retaining member 11 during transport or the like, wear damage due to contact can be reduced.

Furthermore, a peripheral groove 12 is formed in the inner peripheral surface of the rotational assembly 10 facing the corner portion between the upper end face and the outer peripheral surface of the sleeve 6. By means of the peripheral groove 12, even if the lubricant inside the sleeve 6 is thrown out due to the rotation of the shaft 1, due to the surface tension of the lubricant, the lubricant is fed back via the groove 12 and can thus be prevented from spreading to the disc 13.

Figure 4:
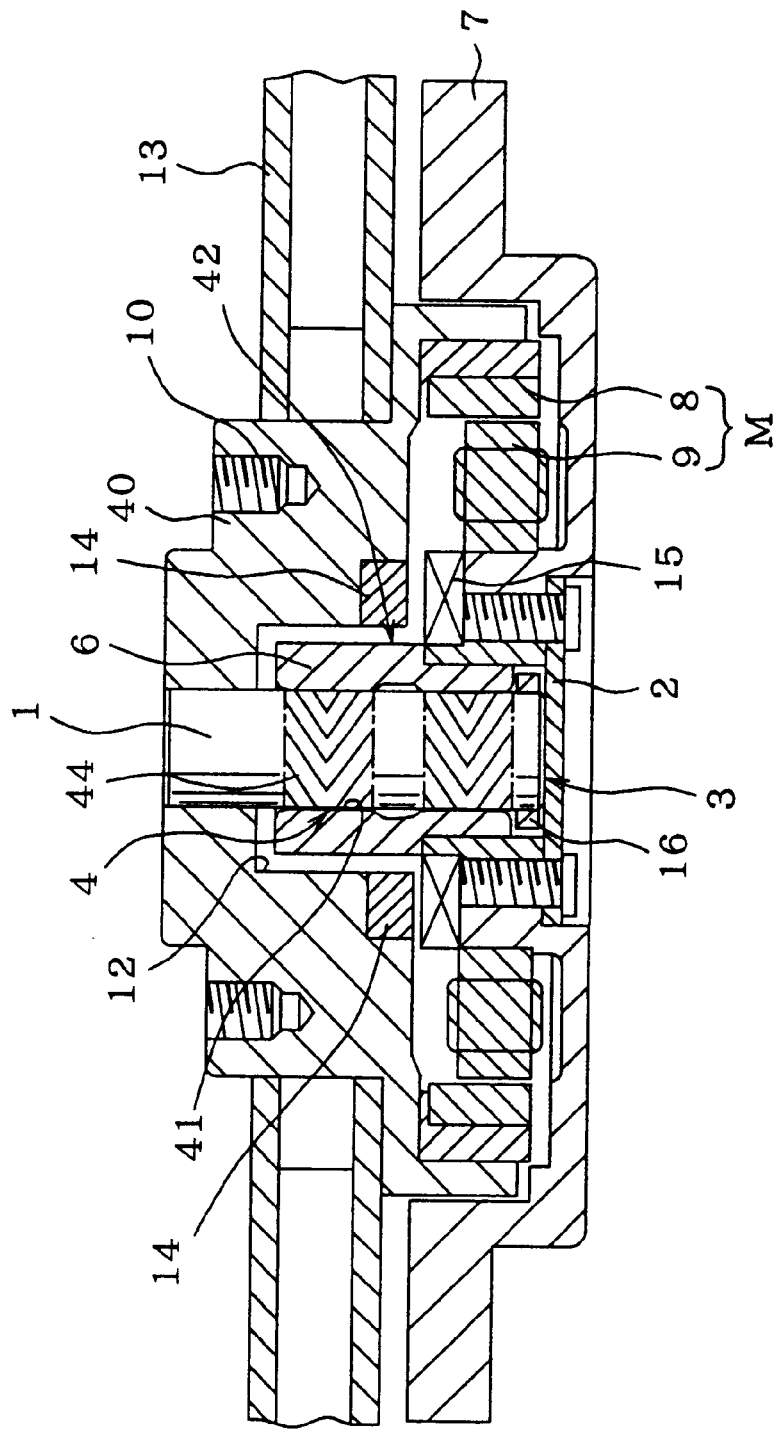
FIG. 4 is a cross sectional view of another example of the disc drive device according to the present invention.

FIG. 4 shows a second embodiment. The magnetic attractive force is exerted with the rotor 9 and stator 8 in an arrangement similar to that of FIG. 3. In order to strengthen the axial magnetic attractive force, an auxiliary magnetic attraction device is provided. More specifically, the rotational assembly 10 has a permanent magnet 14 secured to the hub 40, and the support assembly 42 has a magnetic body 15 which is faced to this permanent magnet 14 across an axial gap and secured to the base 7 thereby producing an axial magnetic attractive force.

Instead of the magnetic body 15, a permanent magnet may be used. Moreover the magnetic body 15 may be secured to the hub 40 and the permanent magnet 14 secured to the base 7.

Furthermore, with this embodiment, as a means to prevent the rotational assembly 10 from coining off the support assembly 42, a flanged portion 16 is provided on the outer peripheral surface of the shaft 1 closer to the thrust bearing 3, protruding radially with opposite sides facing the support assembly 42 across an axial gap. By having this arrangement, even if the flanged portion 16 contacts the support assembly 42 during rotation due to bumping of an external part to the device, since there is lubricant present, damage to the flanged portion 16 at the time of contact can be alleviated. The flanged portion 16 can be a rim portion or protruding portion, and can be provided with a groove for producing dynamic pressure.

The groove for producing dynamic pressure can, however, be omitted on the upper and lower faces of the flanged portion 16, or can be formed on only one of the upper and lower faces of the flanged portion 16.

Figure 5:
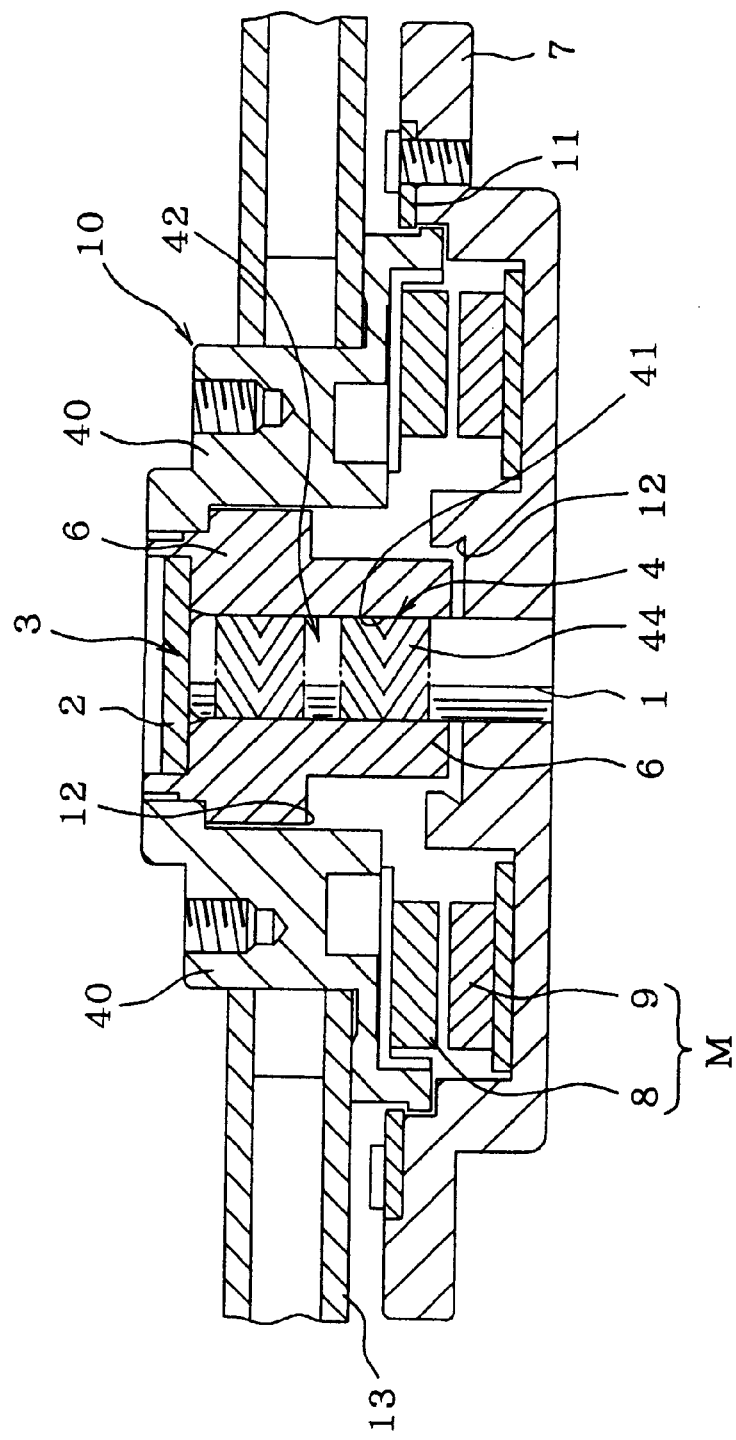
FIG. 5 is a cross sectional view of another example of the disc drive device according to the present invention.

FIG. 5 shows a third embodiment. With this embodiment, a rotational assembly 10 has a sleeve 6, a thrust plate 2 fixed to the sleeve 6, and a hub 40 fixed to the sleeve 6. A support assembly 42 has a shaft 1 fitted into the sleeve 6, and a base 7 fixed to the shaft 1. A motor M is of a plane-to-plane type with a rotor 8 fixed to the rotational assembly 10 and a stator 9 fixed to the support assembly 42, with the mating flat surfaces thereof facing each other axially, so that the axial magnetic attractive force can be set large. The "plate-to-plane type" is also referred to as "axial air gap type".

With this example, the end face of the shaft 1 and the thrust bearing face provided on the thrust plate 2 constitute a planar hydrodynamic fluid thrust bearing 3, while the outer peripheral surface of the shaft 1 and the radial bearing face 41 of the inner peripheral face of the sleeve 6 constitute a radial hydrodynamic fluid bearing 4. The thrust bearing 3 has a groove in the end face of the shaft 1 for producing a dynamic pressure. After crimping the mating thrust plate 2 onto the sleeve 6, this is bonded in order to prevent the leakage of lubricant.

Figure 6:
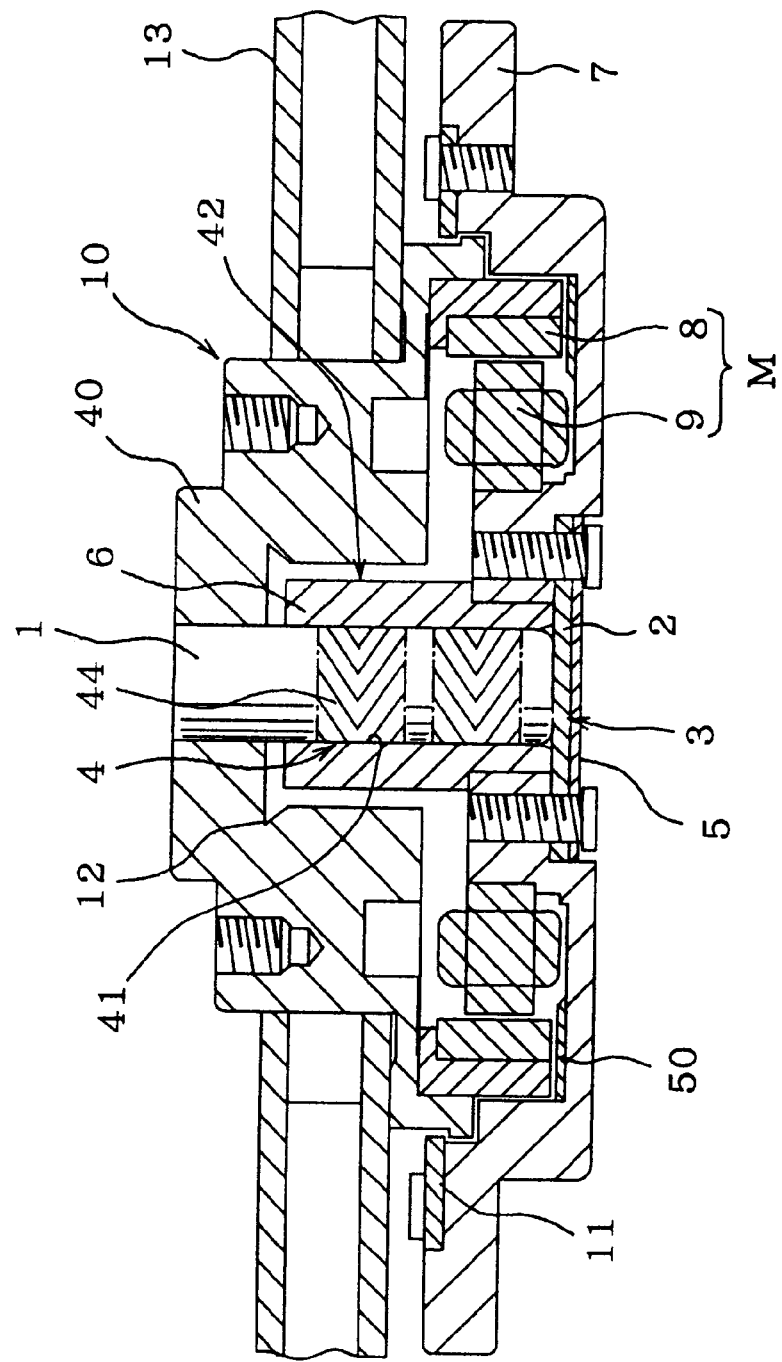
FIG. 6 is a cross sectional view of another example of the disc drive device according to the present invention.

FIG. 6 shows a fourth embodiment. With this embodiment, a magnetic member 50 for attraction is secured to the base 7 and arranged facing the lower face of the rotor 8 of permanent magnet of the motor M across an axial gap so that an axial magnetic attractive force is applied between the rotor 8 and the magnetic member 50. The magnetic member 50 is part of the support assembly 42.

With the present embodiment, as with the first embodiment, in FIG. 3, the rotor 8 and the stator 9 are axially displaced from each other, so that an axial magnetic attractive force also acts between the stator 9 and the rotor 8. With the arrangement of this fourth embodiment, then compared to the first embodiment, an even larger magnetic attractive force can be made to act. In the case where the axial magnetic attractive force between the rotor 8 and the magnetic member 50 itself is sufficient, then the stator 9 and the rotor 8 need not be displaced axially from each other.

With the fourth embodiment, since the axial gap between the rotor 8 and the magnetic member 50 can be made small, then the magnetic attractive force can be increased.

Moreover in the case where, as with the embodiments in FIGS. 3, 4 and 6, the stator 9 is displaced axially from the rotor 8, there is concern that if the rotor 8 and the stator 9 are displaced too much, electrical noise from the motor can become excessive. However, results confirmed by experiment show this not to be the case.

Furthermore, since as with the second embodiment, it is not necessary to provide a separate magnet for attraction, there is a cost benefit.

The magnetizing pattern for the rotor 8 can be as with a typical magnetizing pattern for a motor. However in the case where the magnetic attractive force needs to be larger, then preferably the lower face of the rotor 8 is made with a special magnetizing pattern for attraction. In this case, it is preferable if the lower face of the rotor 8 is made with a concentric magnetizing pattern for different poles with the inner peripheral portion and outer peripheral portion as the north and south poles respectively, so that eddy currents generated in the magnetic member 50 can be minimized, and losses in the motor M kept small.

Now with the above embodiments, preferably an air discharge port is not provided between the thrust bearing 3 and the radial hydrodynamic fluid bearing 4 so that the chamber adjoining the thrust bearing 3 is sealed and retention of the lubricant is excellent. Hence reliability is improved even when used over long periods.

Moreover, for the lubricant, one with good temperature viscosity properties is preferable, for example a fluorinated oil having a straight chain structure and a Viscosity Index of 300 or more where the viscosity change with respect to changes in temperature is small. In particular, in order to improve sliding properties and retention of lubricant, a fluorinated oil to which perfluoroalkylpolyether having terminal carboxylic acid has been added is preferable.

According to the present invention, since the rotational assembly is supported by a radial hydrodynamic fluid bearing and a thrust bearing made up of the end face of the shaft, there is the effect that the deviation of non-repetitive runout is reduced and the starting torque is minimal. Moreover, since a predetermined magnetic attractive force acts in the axial direction, there is no restriction to the orientation of the device during use. Furthermore since it is not necessary to provide on the shaft, the flanged portion for taking the axial load, there is the effect that assembly is simplified.

In the following examples of the disc drive device, specifically spindle motor, a first radial bearing face is formed in a shaft in a rotational assembly and a second radial bearing face is formed in a bearing member in a support assembly, which are opposed to each other with a radial bearing clearance therebetween so as to form a radial hydrodynamic fluid bearing.

The shaft has a first thrust bearing face which is opposed to a second thrust bearing face of the support assembly to form a thrust bearing. One of the rotational assembly and the support assembly has a motor rotor and the other has a motor stator.

In the spindle motor of this example, the shaft has a flanged portion or rim portion located radially outer than the first radial bearing face.

The flanged portion has an end face remote from the thrust bearing which is opposed to the bearing member with an axial clearance therebetween.

The radial clearance between the outer peripheral surface of the flanged portion and the support assembly is larger than the radial bearing clearance and less than 0.5 mm.

The thrust bearing receives an axial load due to a magnetic attractive force up to 30N and larger than the dead weight of the rotational assembly.

Since the rotational assembly is supported by the radial hydrodynamic fluid bearing and the thrust bearing, the deviation of non-repetitive runout is small.

Since a predetermined magnetic attractive force is exerted axially, there is no limitation in the attitude orientation of the device during use.

Since the end face of the flanged portion or rim portion remote from the thrust bearing is opposed to the bearing member with an axial clearance, the shaft never comes off the bearing member.

Since the radial clearance between the outer peripheral surface of the flanged portion and the mating inner peripheral surface of the support assembly is larger than the radial bearing clearance and up to 0.5 mm, even if an impact from outside is exerted in a direction to make the shaft come out of the support assembly, the clearance functions as a throttle against the lubricant fluid when it flows through the clearance from the one axial side of the flanged portion to the other side, causing a resistance against the flow of lubricant. Accordingly, the axial displacement of the shaft with respect to the support assembly can be prevented.

If the impact occurs in a short period of time 10–100 milli-seconds (e.s. 0.05–0.06 sec), the shaft hardly moves with respect to the support assembly.

Figure 7:
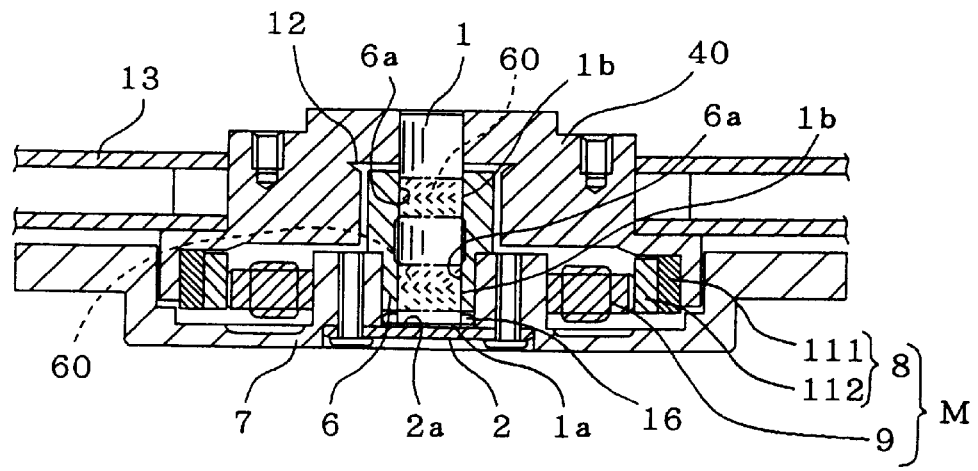
FIG. 7 is a cross sectional view of another example of the disc drive device, spindle motor, according to the present invention.

Now, in the drawings, FIG.7 shows an example of the spindle motor according to the present invention.

The spindle motor has a rotational assembly comprising a shaft 1, a hub 40 for mounting a disc (not shown) thereto and a flanged portion or rim portion 16 attached to the shaft 1, and a support assembly comprising a bearing member, specifically sleeve 6 faced to the shaft 1 and a base 7 fixedly fitted onto the lower end portion of the sleeve 6 on the outer periphery thereof, and a thrust plate 2 fixed to the base 7 to close the cylindrical hole of the sleeve 6. There is an annular groove defined by the lower end of the sleeve 6, the inner peripheral surface of the base 7 and the upper surface of the thrust plate 2, so that a flanged portion is received in the groove.

The flanged portion 16 is formed in an annular shape and fixed to the shaft 1 at one end portion thereof while the hub 40 is fixed to the shaft 1 at the other end portion thereof. Also fixed to the hub 40 is a rotor 8 which comprises a backyoke 111 fixed to the hub 40 and a magnet 112 fixed to the backyoke 111.

Fixed to the support assembly is a stator 9 which is opposed to the rotor 8 fixed to the rotational assembly so as to form a motor M.

The shaft 1 is provided with two cylindrical radial bearing faces 1b axially spaced apart from each other while the sleeve 6 is provided with two radial bearing faces 6a axially spaced apart from each other. The cylindrical radial bearing faces 1b can be referred to as first radial bearing face, while the radial bearing faces 6a can be referred to as second radial bearing face. The first and second radial bearing faces 1b, 6a are opposed to each other with a clearance therebetween to form a radial hydrodynamic fluid bearing. At least one of the first and second radial bearing faces 1b, 6a (radial bearing face 1b in the example illustrated) formed with a groove 60 in the herring-bone shape to produce dynamic pressure.

The shaft 1 is provided with a flat thrust bearing face 1a at one shaft end thereof while a thrust plate 2 is provided with a thrust bearing face 2a. The flat thrust bearing face 1a can be referred to as first thrust bearing face while the thrust bearing face 2a can be referred to as second thrust bearing face. The first and second thrust bearing faces 1a, 2a are opposed to each other with a clearance therebetween to form a thrust hydrodynamic fluid bearing. At least one of the first and second thrust bearing faces 1a, 2a (thrust bearing face 2a in the example illustrated) is formed with a groove 70 in the spiral shape to produce dynamic pressure.

The flanged portion 16 is mounted to the shaft 1 through press fitting or adhesion and located radially further outwards than the first radial bearing face 1b.

If the thrust plate 2 is made by plastic injection molding, then the groove 70 for producing the hydrodynamic fluid can be made by molding, so that manufacturing costs are low. In particular, if made by plastic injection molding with carbon fiber and Teflon (registered trademark), i.e. polytetrafluoroethylene, added to a base of PPS (polyphenylene sulfide resin), then this gives excellent sliding properties, strength, and moldability, which is desirable.

When the axial load is large, the thrust plate 2 made of a plastics material may be supported between a steel plate support and the base 7. In addition, the groove 70 can be omitted, and instead at least one of the thrust bearing surfaces 1a, 2a is formed in a spherical convex shape to form a so-called pivot bearing where the thrust bearing faces come into point contact with each other.

On the other hand, if the sleeve 6 of the radial hydrodynamic fluid bearing is made from a copper-based material, then the groove 60 for producing a dynamic pressure can be easily provided on the radial bearing face 6a of the sleeve 6. If the sleeve 6 is made from a copper-based material, the sliding characteristics between the radial bearing face 6a of the sleeve 6 and the radial bearing face 1b of the stainless steel shaft 1 are excellent, so starting and stopping durability is excellent.

The sleeve 6 and the thrust plate 2 are directly fixed to the base 7, and hence assembly is simplified and reliability is good.

In the present example, the rotor 8 of the motor M can be axially displaced from the stator 9, specifically the lateral central cross sectional face of the stator 9 is lower than that of the rotor 8 in FIG. 7, so that the rotor 8 and stator 9 are subjected to axial magnetic attractive force and the thrust bearing is subjected to axial load by way of magnetic attractive force larger than the dead weight of the rotational assembly and up to 30N.

Incidentally, it is possible that one of the rotational assembly and the support assembly has a magnet fixed thereto and the other has a magnet or magnetic material fixed thereto to cause axial magnetic attractive force exerted to the rotational assembly and to the support assembly, so that axial load is applied to the thrust bearing.

The axial magnetic attractive force by which the thrust bearing is subjected to the axial load is more desirably twice the dead weight of the rotational assembly or more and up to 10N.

If the axial magnetic attractive force is smaller than the dead weight of the rotational assembly, the thrust bearing face 1a of the shaft 1 would be separated from the thrust bearing face 2a of the thrust plate 2 while the flanged portion 16 would come axially into contact with the sleeve 6. On the other hand, if the axial magnetic attractive force is larger than 30N, the axial load applied to the thrust bearing would be large to make the start torque large, so as to cause an abrasion problem during start and stop.

When the axial magnetic attractive force is twice the weight of the rotational assembly or more, the thrust bearing face 1a of the shaft 1 is kept in contact with the thrust bearing face 2a of the thrust plate 2. When the axial magnetic attractive force is up to 10N, the axial load applied to the thrust bearing is not large, and there is no need of using an expensive material such as ceramics for the thrust bearing surface of the thrust plate 2, leading to cost reduction.

The flanged portion 16 is desirably integrally formed with the shaft 1 made of stainless steel. The flanged portion 16 when independent from the shaft 1 is made of a material such as aluminum alloy, stainless steel, plastics etc., but it is desirable that the coefficiency of linear expansion is common with the shaft 1 to prevent it from being loosened due to temperature change. The flanged portion 16 and the shaft 1, both made of stainless steel, are good in sliding relation with the sleeve 6 made of a material including copper in the bearing assembly.

The disc shaped flanged portion 16 can be mounted to the lower end of the shaft 1 with setscrews or interference fitting. In this case, the lower surface of the flanged portion 16 is faced to the thrust bearing face of the thrust bearing.

The surface of the hub 40 opposed to the support assembly is formed with an inner peripheral groove 12 along the corner portion between the inner peripheral surface and the bottom surface or upper surface. With this inner peripheral groove 12, the lubricant fluid within the radial bearing clearance, even if it is scattered through the outer peripheral surface of the shaft 1 during rotation, is arrested by the inner peripheral groove 12 by way of the surface tension of the lubricant fluid. Accordingly, the lubricant fluid is prevented from being scattered toward the surface of the disc 13.

Figure 8:
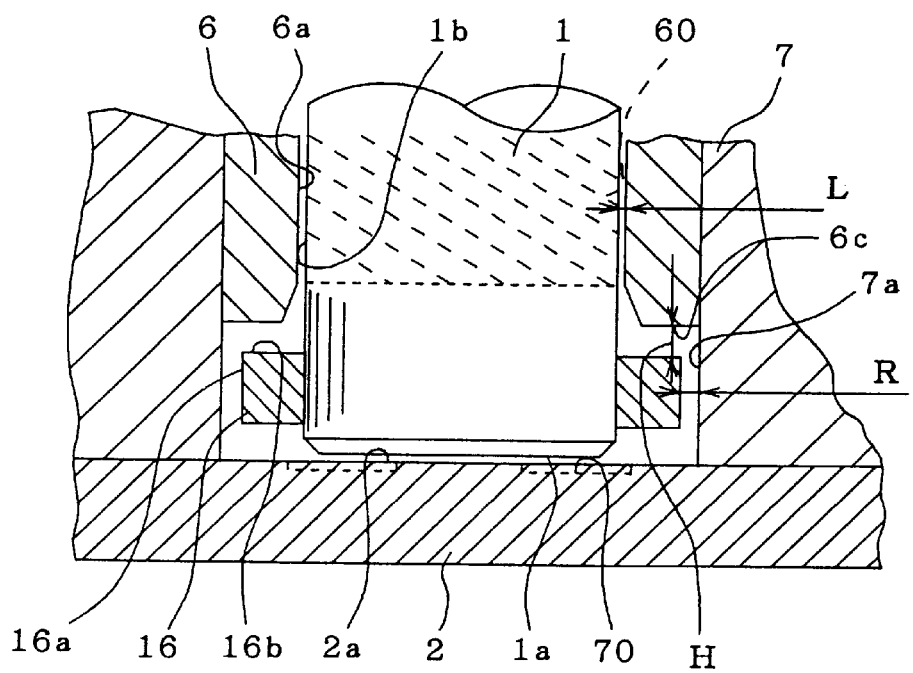
FIG. 8 is an enlarged view of the shaft end portion of the spindle motor of FIG. 7.

FIG. 8 shows an enlarged view of a peripheral portion of the flanged portion 16 at the shaft end portion. The lower portion of the sleeve 6 is short of the thrust plate 2 to form the annular groove to accommodate the flanged portion 16.

The radial clearance R between the outer peripheral surface 16a of the flanged portion 16 and the inner peripheral surface 7a of the base 7 at the lower portion thereof is larger than the radial bearing clearance L between the radial bearing face 6a of the sleeve 6 and the radial bearing face 1b of the shaft 1 and controlled up to 0.5 mm. If the radial clearance R is larger than 0.5 mm, the resistance when the lubricant fluid flows through the clearance R would be small, while if the radial clearance R equal to or smaller than the value of the radial bearing clearance L, the outer peripheral surface 16a of the flanged portion 16 would come into contact with the support assembly, specifically with the inner peripheral surface of the base 7.

Due to the condition of $L<R \leq 0.5$ mm, when any shock is exerted from outside in the axial direction with respect to the shaft 1, the radial clearance R functions as a throttle against the lubricant fluid such as oil, grease, to be a resistance against the lubricant fluid flowing through the clearance R. Accordingly, the rotational assembly is prevented from axially moving. As a result, the shaft assembly hardly moves with reference to the support assembly even when it receives small impacts during a short period of time up to the degree of less than 100 milli-seconds.

Although the lower portion of the sleeve 6 is short of the thrust plate 2 in FIG. 8, the lower portion of the sleeve 6 can be made thin, e.g. half the thickness of the main portion of the sleeve 6 and extended to reach the thrust plate 2, so that the outer peripheral surface 16a of the flanged portion 16 face the thin lower portion of the sleeve 6.

With respect to the practical tolerance from the mass productivity and process cost, the coaxiality between the outer peripheral surface 16a of the flanged portion 16 and the radial bearing face 1b of the shaft 1 is 0.005 mm while the coaxiality between the radial bearing face 6a of the sleeve 6 and the inner peripheral surface 7a of the base 7 is 0.005 mm. The tolerance in size of the outer diameter of the outer peripheral surface 16a of the flanged portion 16 is 0.01 mm while the tolerance in size of the inner diameter of the inner peripheral surface 7a of the base 7 is 0.01 mm. Taking into consideration of the accumulated tolerances, the radial clearance R between the outer peripheral surface 16a of the flanged portion 16 and the inner peripheral surface of the base 7 is desirably 0.03 m or larger to avoid contact therebetween. On the other hand, the radial clearance R is desirably up to 0.2 mm to obtain the sufficient resistance to flow against the lubricant fluid. Incidentally, it is not desirable from the point of bearing performance that the viscosity of the lubricant fluid is excessively high.

The end face 16b of the flanged portion 16 distal from the thrust bearing is opposed to the lower surface 6c of the sleeve 6 of the support assembly with the axial clearance H therebetween. Since the axial clearance H is set in the range of from 0.01 mm to 0.5 mm, the rotational assembly never moves by the amount of 0.5 mm or more even if it moves in the direction it comes off the support assembly due to a very large shock from outside.

Incidentally, the axial clearance H is desirably 0.1 mm or less if the prevention of damage on the head opposed to the magnetic disc attached to the hub 40 is taken into consideration.

It is possible that the upper end surface 16b of the flanged portion 16 is formed with a groove for producing dynamic pressure, so that the upper end surface 16b constitutes a thrust hydrodynamic fluid bearing together with the lower surface 6c of the sleeve 6 opposed to the upper end surface 16b. In this case, even if the rotational assembly is axially moved toward the support assembly due to a very large shock, the thrust hydrodynamic fluid bearing supports the shock, so that the flanged portion 16 can be prevented from coming into contact with the support assembly.

How ever, in the structure as mentioned above where the flanged portion 16 is formed on the outer peripheral surface of the shaft 1 on the side of the thrust bearing to radially protrude and to have the both sides opposed to the support assembly with a clearance therebetween, there is no need of forming such a groove for dynamic pressure on the both sides of the flanged portion, or only one of the sides of the flanged portion can be formed with such a groove.

Figure 9:
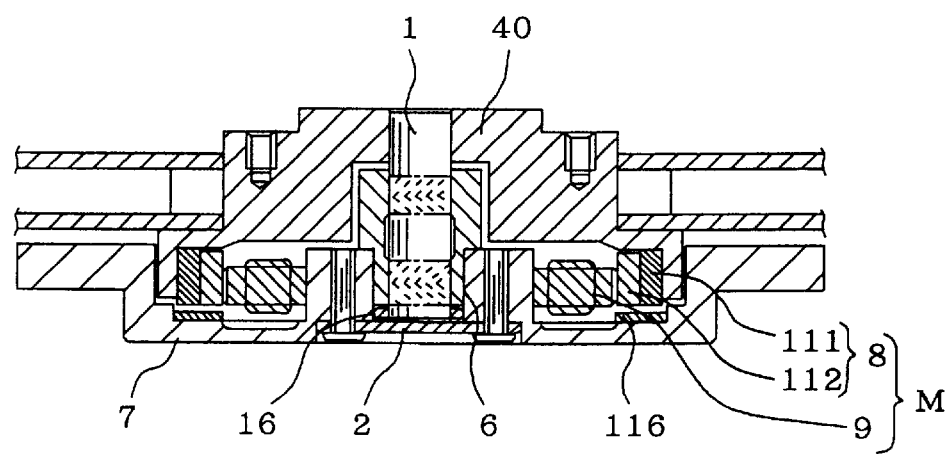
FIG. 9 is a cross sectional view of another example of the spindle motor according to the present invention.

FIG. 9 shows another example of the present invention, where the base 7 is provided with an annular plate 116 of magnetic material for attraction at a location axially opposed to the rotor 8 to exert axial magnetic attractive force to the portion between the rotor 8 and the annular plate 116. With this magnetic attractive force, an axial load is applied to the thrust bearing.

The magnetization pattern of the rotor 8 is the same to that of the conventional motors. However, when the magnetization pattern for attraction is applied to the lower end surface of the magnet 112 of the rotor 8 in the conventional motors, an axial magnetic attractive force is caused between the rotor magnet 112 and the annular plate 116. In this case, if one of the outer and inner peripheral portions in the lower end surface of the rotor magnet 112 is magnetized in the N pole with the other magnetized in the S pole, the eddy current can be decreased in the annular plate 116 of the magnetic material. This is desirably leads to the reduction of loss in the motor M.

It should be noted that in FIGS. 7 to 9, the vent by which the outside and inside of the bearing assembly are communicated with each other is not formed between the thrust bearing and the radial hydrodynamic fluid bearing, and the clearance between the support assembly and the rotational assembly is placed in the hermetic state which is good for keeping the lubricant fluid, so that the reliability for long time use is desirably improved.

In FIGS. 7 to 9, the shaft is contained in the rotational assembly which is rotated, but can be applied to the stricture where the stator is fixed to the support assembly including the shaft and the rotor is fixed to the rotational assembly including the bearing member to be opposed to the stator, so that the rotational assembly with the rotor and bearing member is rotated.

The motor can be of the plane-to-plane type as in FIG. 5, other than the periphery-to-periphery type having opposed peripheral surfaces between the rotor and stator. The "periphery-to-periphery type" can be also be referred to as a cylindrical air gap type. The thrust bearing can be formed with the groove for producing dynamic pressure on the thrust bearing face 1a.

The thrust plate 2 can be fixed to the base 7 or to the sleeve 6 by crimping the thrust plate 2 to the base 7 or to the sleeve 6 and applying adhesive to that portion for preventing the lubricant fluid from leaking out.

Moreover, the lubricant with good temperature viscosity properties is preferable for use in the clearance defined by the shaft assembly and the bearing assembly. For example, the lubricant may be preferably a fluorinated oil with a high viscosity index where the viscosity change with respect to changes in temperature is small. In particular, in order to improve sliding properties and retention of lubricant, a fluorinated oil to which perfluoroalkylpolyether having terminal carboxylic acid has been added is preferable.

Figure 10:
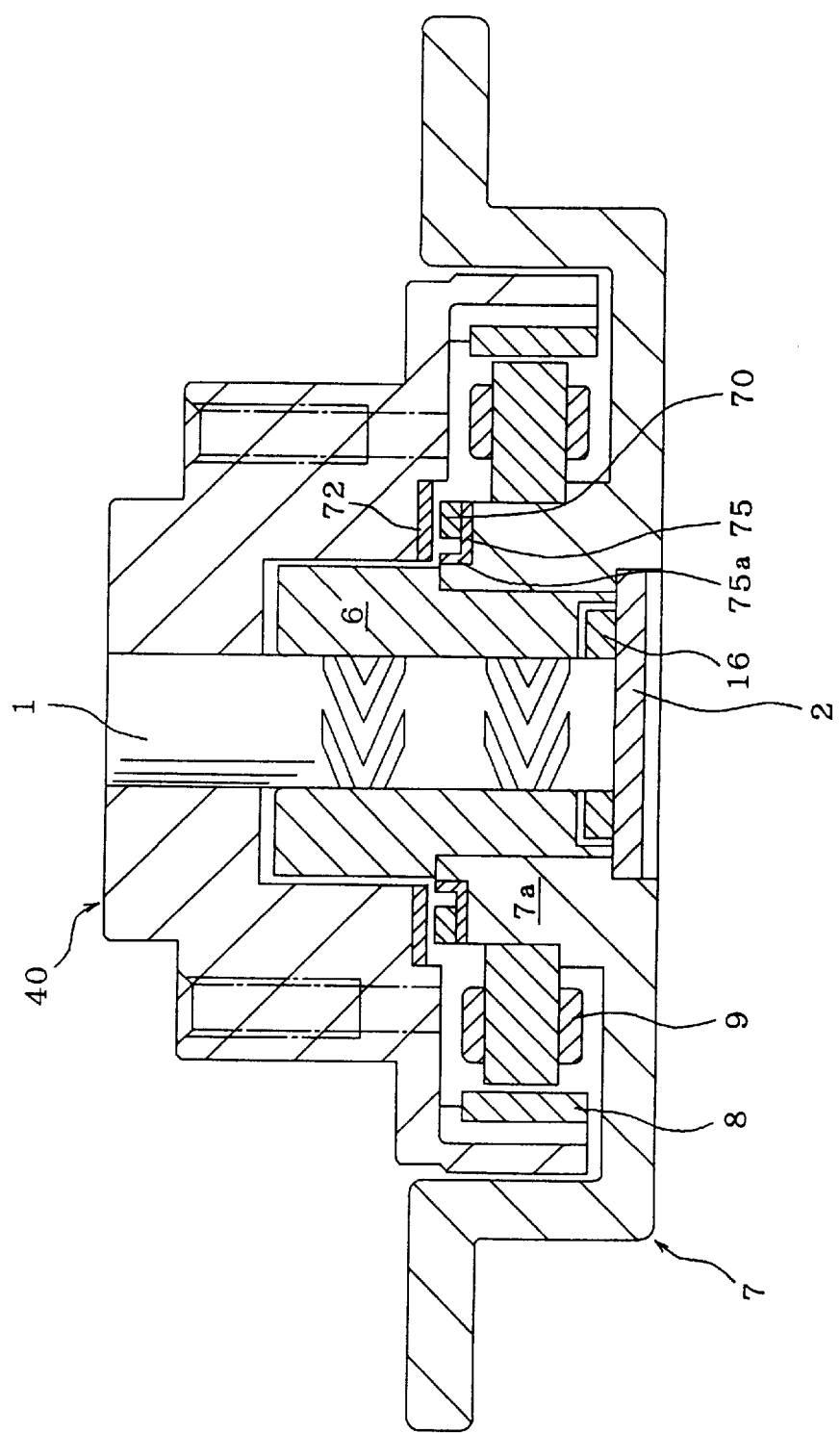
FIG. 10 is a cross sectional view of another example of the spindle motor according to the present invention.

FIG. 10 shows another example of the present invention.

A magnetic iron piece 72 to be attracted is mounted to the lower surface of the hub 40, while a permanent magnet 70 is mounted to the upper surface of the annular portion 7a of the base 7. The permanent magnet 70 and the magnetic iron piece 72 cause magnetic attractive force to pull the hub 40 toward the base 7. The permanent magnet 70 is provided with a yoke 75 of magnetic material to prevent the leakage of magnetic flux to make the attractive force stronger.

The yoke 75 is formed in a L-shape in cross section, and has an axially extending protrusion 75a on the radially inner side.

The magnetic flux passes through the magnetic iron piece 72 from the upper surface of the magnet 70, enters the yoke 75 from the end face of the protrusion 75a, and returns to the lower surface of the magnet 70. This flux flow can be reversed.

The magnetic flux is concentrated on the tipper end face of the protrusion 75a, but since the protrusion 75a is formed on the radially inside of the yoke 75, the radius from the central line of the concentrated portion of magnetic flux is small Accordingly, the moment load provided when the magnetic flux is not even, can be reduced, so that the radial load on the bearing can be made small.

According to the present invention, since the rotational assembly is supported by a radial hydrodynamic fluid bearing and a thrust bearing which can be a hydrodynamic fluid bearing, the non-repetitive runout (NRRO) of the spindle motor obtained is small. Moreover, since a predetermined magnetic attractive force acts in the axial direction in this spindle motor, there is no restriction to the attitude orientation during use. Furthermore by providing the shaft with the flanged portion, the axial displacement of the support assembly with reference to the rotational assembly is reduced.

In addition, the flow resistance of the lubricant fluid in the radial clearance between the flanged portion and the support assembly is increased so as to provide good impact resistance.

What is claimed is:

1. A disc drive device comprising:
   a rotational assembly to which a disc is to be mounted,
   a radial hydrodynamic fluid bearing,
   a thrust bearing,
   a motor for driving the rotational assembly, and
   a support assembly to which the rotational assembly is rotatably supported through the radial hydrodynamic fluid bearing and the thrust bearing,
   the thrust bearing receiving an axial load larger than the dead weight of the rotational assembly and up to 30N caused by a magnetic attractive force,
   said support assembly including a yoke and a magnet on the yoke providing said magnetic attractive force, the yoke having an axially extending protrusion at a radially inward part of the yoke enhancing said attractive force so as to reduce a moment load provided when magnetic flux is uneven.

2. A disc drive device of claim 1, wherein one of the rotational assembly and the support assembly has a shaft which has an end face forming part of the thrust bearing.

3. A disc drive device of claim 2, wherein the shaft has an outer peripheral surface and a flanged portion on the outer peripheral surface and radially extending with both sides thereof opposed to the support assembly with an axial clearance therebetween.

4. A disc drive device of any one of claims 1 to 3, wherein the thrust bearing is made of plastics and formed by injection molding.

5. A disc drive device of any one of claims 1 to 3, wherein the motor comprises a stator and rotor having opposed peripheries, and the stator is axially displaced from the rotor, so that said axial load is applied to the thrust bearing.

6. A disc drive device of any one of claims 1 to 3, wherein the motor has a stator and rotor having opposed peripheries, and the rotor has a magnetic piece below which said yoke and said magnet are provided to be opposed to the magnetic piece with an axial clearance therebetween to cause said magnetic attractive force.

7. A disc drive device of any one of claims 1 to 3, wherein a fluorinated oil lubricant in a straight chain structure having a Viscosity Index of at least 300 is used.

8. A disc drive device of any one of claims 1 to 3, wherein perfluoroalkyl polyether having terminal carbooxylic acid is added to the fluorinated oil.

9. A disc drive device of any one of claims 1 to 3, wherein the thrust bearing is selected from the group of a pivot bearing and another hydrodynamic fluid bearing.

* * * * *